United States Patent
Miyamoto

(10) Patent No.: US 9,961,222 B2
(45) Date of Patent: May 1, 2018

(54) IMAGE PROCESSING APPARATUS, IMAGE PROCESSING METHOD, AND NON-TRANSITORY COMPUTER-READABLE RECORDING MEDIUM HAVING RECORDED THEREIN IMAGE PROCESSING PROGRAM

(71) Applicant: KYOCERA Document Solutions Inc., Osaka-shi, Osaka (JP)

(72) Inventor: Keita Miyamoto, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 60 days.

(21) Appl. No.: 15/085,107

(22) Filed: Mar. 30, 2016

(65) Prior Publication Data

US 2016/0295053 A1    Oct. 6, 2016

(30) Foreign Application Priority Data

Mar. 31, 2015  (JP) ................. 2015-072966

(51) Int. Cl.
*H04N 1/00* (2006.01)
*H04N 1/387* (2006.01)
*H04N 1/44* (2006.01)

(52) U.S. Cl.
CPC ..... *H04N 1/00872* (2013.01); *H04N 1/00854* (2013.01); *H04N 1/4493* (2013.01); *H04N 2201/0094* (2013.01)

(58) Field of Classification Search
CPC .......... H04N 1/00854; H04N 1/00872; H04N 1/4493; H04N 1/00347; H04N 1/444; H04N 1/00137; H04N 1/00151; G06F 21/36; G06F 21/32; G06K 9/6217; G06K 9/00221; G06K 9/00248; G06K 9/00268; G06K 9/00275; G06K 9/00281; G06K 9/00288; G06K 9/00295; G06K 9/6256; G06K 2009/00328

(Continued)

(56) References Cited

U.S. PATENT DOCUMENTS

| 6,535,636 | B1* | 3/2003 | Savakis ................. G06T 7/0002 359/670 |
| 2013/0011068 | A1* | 1/2013 | Albouyeh ............... G06F 21/36 382/190 |

(Continued)

FOREIGN PATENT DOCUMENTS

| JP | 2003025684 A | 1/2003 |
| JP | 2003087632 A | 3/2003 |

*Primary Examiner* — Chad Dickerson
(74) *Attorney, Agent, or Firm* — Alleman Hall Creasman & Tuttle LLP

(57) ABSTRACT

When a first image is designated in an image output instruction, a first determination portion in an image processing apparatus determines whether or not an operator is a restricted subject who is restricted from outputting through an output portion, on the basis of restriction information. A restriction process portion executes a restriction process of restricting output of first image data of the first image through the output portion when the operator is determined to be the restricted subject by the first determination portion, and approves output of the first image data of the first image through the output portion when the operator is determined not to be the restricted subject by the first determination portion.

13 Claims, 11 Drawing Sheets

| IMAGE IDENTIFICATION INFORMATION | USER ID OF SECURITY SETTING INDIVIDUAL | USER ID OF RESTRICTED SUBJECT | PART |
|---|---|---|---|
| G1 | ID1 | ID2 | WHOLE BODY |
| G2 | ID2 | ID5 | FACE |
| | | ID6 | FACE |
| G2 | ID7 | ID2 | WHOLE BODY |
| | | ID4 | FACE |
| G3 | ID7 | ID2 | FACE |
| . | . | . | . |
| . | . | . | . |
| . | . | . | . |

(58) Field of Classification Search
USPC ......... 358/1.11–1.18, 1.9, 2.1; 382/190, 118,
382/115; 348/207.1; 726/19
See application file for complete search history.

(56) References Cited

U.S. PATENT DOCUMENTS

2013/0286223 A1* 10/2013 Latta .................. H04N 1/00347
348/207.1
2016/0232827 A1* 8/2016 Chen ..................... G09G 3/2003

* cited by examiner

FIG. 3A

| IDENTIFICATION INFORMATION OF SHARED IMAGE DATA | USER ID OF USER CAPTURED IN SHARED IMAGE | NUMBER OF INDIVIDUALS CAPTURED IN SHARED IMAGE |
|---|---|---|
| G1 | ID1<br>ID2 | FIVE INDIVIDUALS |
| G2 | ID2<br>ID4<br>ID5<br>ID6 | FOUR INDIVIDUALS |
| G3 | ID2<br>ID5<br>ID7 | FIVE INDIVIDUALS |
| G4 | ID3 | THREE INDIVIDUALS |
| ⋮ | ⋮ | ⋮ |

FIG. 3B

| IMAGE DATA IDENTIFICATION INFORMATION | USER ID OF SECURITY SETTING INDIVIDUAL | USER ID OF RESTRICTED SUBJECT |
|---|---|---|
| G1 | ID1 | ID2 |
| G2 | ID2 | ID5 |
|  |  | ID6 |
| G2 | ID7 | ID2 |
|  |  | ID4 |
| G3 | ID7 | ID2 |
| ⋮ | ⋮ | ⋮ |

FIG. 8

| IMAGE IDENTIFICATION INFORMATION | USER ID OF SECURITY SETTING INDIVIDUAL | USER ID OF RESTRICTED SUBJECT | PART |
|---|---|---|---|
| G1 | ID1 | ID2 | WHOLE BODY |
| G2 | ID2 | ID5 | FACE |
|  |  | ID6 | FACE |
| G2 | ID7 | ID2 | WHOLE BODY |
|  |  | ID4 | FACE |
| G3 | ID7 | ID2 | FACE |
| ⋮ | ⋮ | ⋮ | ⋮ |

IMAGE PROCESSING APPARATUS, IMAGE PROCESSING METHOD, AND NON-TRANSITORY COMPUTER-READABLE RECORDING MEDIUM HAVING RECORDED THEREIN IMAGE PROCESSING PROGRAM

INCORPORATION BY REFERENCE

This application is based upon and claims the benefit of priority from the corresponding Japanese Patent Application No. 2015-072966 filed on Mar. 31, 2015, the entire contents of which are incorporated herein by reference.

BACKGROUND

The present disclosure relates to an image processing apparatus for conducting image-output processes such as an image formation process, an image processing method, and a non-transitory computer-readable recording medium having recorded therein an image processing program.

Image processing apparatuses such as a copy machine includes a storage portion for storing image data that is to be processed. As one example of this type of an image processing apparatus, an image processing apparatus configured such that multiple users can share and use the storage portion is known. In the storage portion of this image processing apparatus, image data that is to be shared by multiple users who have been registered to the image processing apparatus is stored. In addition, the image processing apparatus can print the image data shared in the storage portion in response to a print instruction given by each of the users. Thus, with this image processing apparatus, multiple users registered to the image processing apparatus can share the image data stored in the storage portion, and each of the users can freely output, as an image, the shared image data stored in the storage portion.

It should be noted that a printer having a function of concealing information printed on a specific area of print media such as a postal matter or a document, by forming a paint-out image on the specific area, is known.

SUMMARY

An image processing apparatus according to one aspect of the present disclosure has an output portion, a storage portion, a first determination portion, and a restriction process portion. The output portion can output image data of an image designated in an image output instruction inputted through an operation by an operator. The storage portion is configured to store first image data of a first image that includes a photographic-subject image of another individual who is different from the operator, and that is provided with restriction information for restricting output of the image data through the output portion. The first determination portion is configured to determine, on the basis of the restriction information and when the first image is designated in the image output instruction, whether or not the operator is a restricted subject who is restricted from outputting through the output portion. The restriction process portion is configured to execute, when the operator is determined to be the restricted subject by the first determination portion, a restriction process to restrict output, through the output portion, of the first image data of the first image designated in the image output instruction, and, when the operator is determined not to be the restricted subject by the first determination portion, approve output, through the output portion, of the first image data of the first image designated in the image output instruction.

An image processing method according to another aspect of the present disclosure is an image processing method including a first step, a second step, and a third step, and is for an image processing apparatus including: an output portion capable of outputting image data of an image designated in an image output instruction inputted through an operation by an operator; and a storage portion configured to store first image data of a first image that includes a photographic-subject image of another individual who is different from the operator, and that is provided with restriction information for restricting output of the image data through the output portion. The first step is a step of determining, based on the restriction information and when the first image is designated in the image output instruction, whether or not the operator is a restricted subject who is restricted from outputting through the output portion. The second step is a step of executing, when the operator is determined to be the restricted subject at the first step, a restriction process to restrict output, through the output portion, of the first image data of the first image designated in the image output instruction. The third step is a step of approving, when the operator is determined not to be the restricted subject at the first step, output, through the output portion, of the first image data of the first image designated in the image output instruction.

A recording medium according to another aspect of the present disclosure is a non-transitory computer-readable recording medium having recorded therein an image processing program for an image processing apparatus including: an output portion capable of outputting image data of an image designated in an image output instruction inputted through an operation by an operator; and a storage portion configured to store first image data of a first image that includes a photographic-subject image of another individual who is different from the operator, and that is provided with restriction information for restricting output of the image data through the output portion. The image processing program includes a first step, a second step, and a third step. The first step is a step of determining, based on the restriction information and when the first image is designated in the image output instruction, whether or not the operator is a restricted subject who is restricted from outputting through the output portion. The second step is a step of executing, when the operator is determined to be the restricted subject at the first step, a restriction process to restrict output, through the output portion, of the first image data of the first image designated in the image output instruction. The third step is a step of approving, when the operator is determined not to be the restricted subject at the first step, output, through the output portion, of the first image data of the first image designated in the image output instruction.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A shows the correspondence relationship among identification information of image data of an image stored in an image data storage area, a user ID of a user captured in the image, and the total number of individuals captured in the image; and FIG. 3B shows the correspondence relationship among the identification information of an image, a user ID of a security setting individual, and a user ID of a restricted subject.

FIG. 8 shows the correspondence relationship among identification information of an image, a user ID of a security setting individual, a user ID of a restricted subject, and a part of the body.

DETAILED DESCRIPTION

[First Embodiment]

Figure 1:
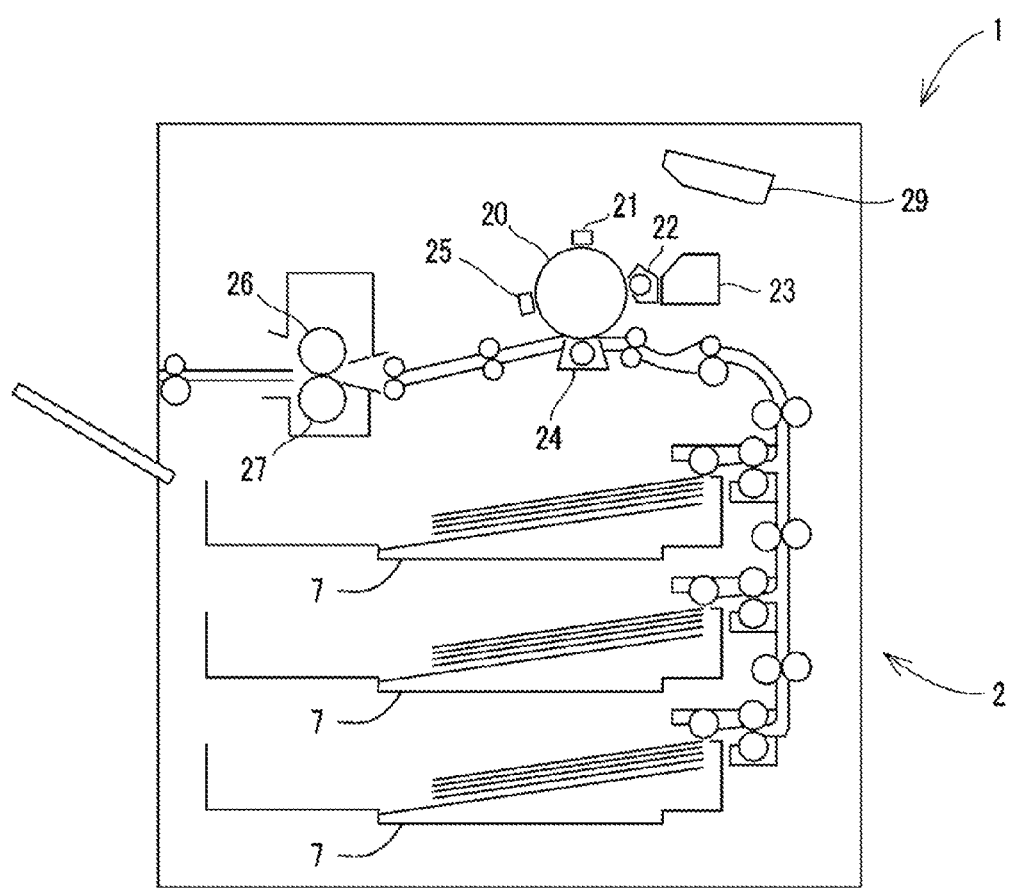
FIG. 1 shows the configuration of an image forming apparatus according to a first embodiment of the present disclosure.
Figure 2:
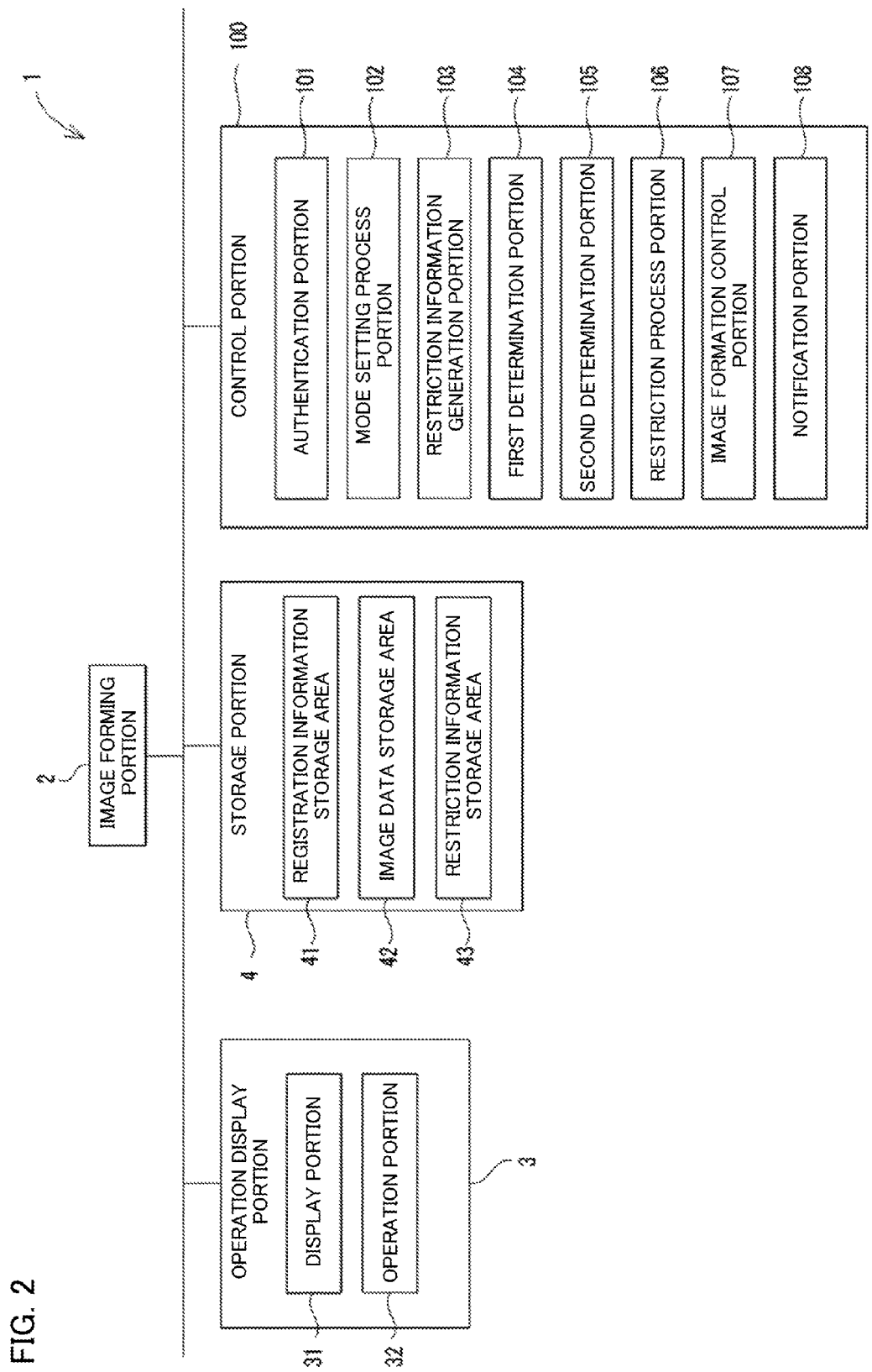
FIG. 2 is a block diagram showing the configuration of the image forming apparatus according to the first embodiment of the present disclosure.

An image forming apparatus 1 according to a first embodiment of the present disclosure will be described with reference to FIGS. 1 and 2.

The image forming apparatus 1 is a printer including an image formation function. It should be noted that the image forming apparatus 1 is not limited to the printer, and may be, for example, a scanner device, a facsimile device, a copy machine, or a multifunctional peripheral or the like having a combination of an image reading function, a facsimile function, and an image formation function. The image forming apparatus 1 is one example of an image processing apparatus of the present disclosure.

The image forming apparatus 1 executes an image formation process (printing process) with respect to an electrophotographic type recording sheet on the basis of image data inputted from an external device such as a personal computer, a USB memory, or the like.

The image forming apparatus 1 has an image forming portion 2, an operation display portion 3, a storage portion 4, and a control portion 100.

The image forming portion 2 includes a photosensitive drum 20, a charging portion 21, a developing portion 22, a toner container 23, a transfer roller 24, a discharging portion 25, a fixing roller 26, a pressure roller 27, a laser scanning unit 29, and sheet-feed cassettes 28.

The image forming portion 2 conducts the image formation process on the recording sheet fed from the sheet-feed cassettes 28 in accordance with the following procedure.

The image forming portion 2 outputs, when an image formation job containing a print instruction is inputted, image data of an image designated in the print instruction. The image forming portion 2 is one example of an output portion of the present disclosure. The photosensitive drum 20 is uniformly charged to a predetermined potential by the charging portion 21. Next, on the basis of image information contained in the image formation job, laser light is emitted on the surface of the photosensitive drum 20 from the laser scanning unit 29. The laser scanning unit 29 emits laser light whose light intensity is adjusted on the basis of the image information.

With this, an electrostatic latent image is formed on the surface of the photosensitive drum 20. Then, the electrostatic latent image on the surface of the photosensitive drum 20 is developed (visualized) as a toner image by the developing portion 22. A toner (developer) supplied from the toner container 23 is housed inside the developing portion 22, and the developing portion 22 develops the electrostatic latent image by using the toner housed therein.

Subsequently, the toner image formed on the photosensitive drum 20 is transferred onto a recording sheet by the transfer roller 24. Then, the toner image transferred onto the recording sheet is heated by the fixing roller 26 and fixed on the recording sheet when the recording sheet passes between the fixing roller 26 and the pressure roller 27 and is discharged. The potential of the photosensitive drum 20 is discharged by the discharging portion 25.

The operation display portion 3 has a display portion 31 and an operation portion 32.

The display portion 31 has, for example, a color liquid crystal display and the like, and displays various types of information to a user operating the operation display portion 3. The operation portion 32 has one or more keys such as various types of push button keys disposed adjacently to the display portion 31 and a touch-panel sensor disposed on a display screen of the display portion 31. The operation portion 32 accepts operations for inputting various types of instructions by the user of the image forming apparatus 1. When operations for instructing execution of various types of processes such as an image reading action are performed by the user, the operation display portion 3 outputs, to the control portion 100, operation signals corresponding to the operations.

The image forming apparatus 1 displays a login screen (not diagrammatically represented) on the display portion 31, and accepts an input of user identification information for identifying the user. The user identification information is information for identifying the user of the image forming apparatus 1. In the following description, the user identification information is represented as a user ID. The user inputs the user ID in the login screen through the operation display portion 3, and is allowed to use the image forming apparatus 1 when being authenticated.

The storage portion 4 is a storage device such as a hard disk configured to store various types of data such as image data. As long as the control portion 100 can read out the data from the storage portion 4, the storage portion 4 may be provided outside the image forming apparatus 1. When the storage portion 4 is provided outside the image forming apparatus 1 in a data communicable manner, a configuration including the storage portion 4 and the image forming apparatus 1 is one example of the image processing apparatus of the present disclosure.

The control portion 100 includes a CPU, a ROM, and a RAM. The CPU is a processor configured to execute various types of calculation processes. The ROM is a nonvolatile storage device configured to store, in advance, information such as control programs for causing the CPU to execute various types of processes. The RAM is a volatile storage portion used as a temporary storage memory (working area) for various types of processes to be executed by the CPU. The control portion 100 is configured to control actions of the image forming apparatus 1 when the CPU executes the programs stored in the ROM.

Processing programs for causing the CPU of the control portion 100 to execute later described processes (see the flowcharts in FIGS. 4 to 7) are stored in the ROM of the control portion 100. The processing programs may be stored in the ROM at the time of shipment of the image forming apparatus 1. Alternatively, the processing programs may be recorded in a non-transitory computer-readable recording medium such as a CD, a DVD, a flash memory, and the like, and the processing programs may be stored in the ROM of the control portion 100 from the recording medium after the shipment.

A conventionally image processing apparatus accepts a print instruction for an image from any user and executes printing of the image as long as the user is registered with the image processing apparatus. The image processing apparatus prints the image, for which the print instruction has been given, on a recording sheet without making any changes. Thus, the image processing apparatus cannot sufficiently protect the privacy of each user. More specifically, even when there is a specific user who wants to prevent an image, which has captured his/her body or face, from being printed on the recording sheet; the conventional image processing apparatus will print the image when a print instruction for that image is inputted by another user, and cannot satisfy the request of the specific user.

On the other hand, in a case where the image processing apparatus places a restriction of uniformly not accepting an output instruction from all other users for an image that has captured the specific user; when the image has captured multiple users, the image processing apparatus will not accept a print instruction even for any of the other users in the image. In this case, only an image that has captured only the user himself/herself can be printed by the user, and the benefit of sharing the image data cannot be enjoyed. In addition, for the purpose of privacy protection, if the image processing apparatus outputs the image after conducting a paint-out process on photographic-subject images of users other than the user who had given the print instruction; the user who had given the print instruction ends up with a printed matter that was not intended, and the request of the user who had given the print instruction cannot be satisfied.

On the other hand, as described in the following, the image forming apparatus 1 according to the present embodiment can enjoy the benefit of sharing image data, properly protect privacy of a user whose photographic-subject image is contained in image data that is to be outputted as an image, and improve convenience of the user who had instructed the image output.

Thus, for example, when there is an image that has captured a user X1, and a user X2 wants to output the image; the image forming apparatus 1 is configured such that output of the image is restricted when the user X2 is set, by the user X1, as a subject for which output is restricted. On the other hand, for the image that has captured the user X1, the image forming apparatus 1 is configured such that output is performed without any restrictions when a user X3, who has not been set by the user X1 as a subject for which output is restricted, attempts to output the image.

The storage portion 4 has a registration information storage area 41, an image data storage area 42, and a restriction information storage area 43.

In the registration information storage area 41, user IDs of users of the image forming apparatus 1 are stored in advance as a first registration information. In addition, as shown in FIG. 3A, information showing the correspondence relationship among identification information of shared image data of a later-described shared image stored in the image data storage area 42, a user ID of a user captured in the image, and the total number of individuals captured in the shared image, is stored in the registration information storage area 41 in advance as a second registration information. For example, as shown in FIG. 3A, in the registration information storage area 41, information indicating that user IDs of users captured in the shared image formed from the shared image data are ID1 and ID2, and that the total number of individuals captured in the shared image is five is associated to shared image data of identification information G1.

The image data storage area 42 is a storage area in which image data inputted from a personal computer through a communication interface portion (not diagrammatically represented) or image data imported from a storage medium such as a USB memory, is stored. The image data stored in the image data storage area 42 is shared by multiple users of the image forming apparatus 1. In the following, this image data is referred to as shared image data, and an image shown by the shared image data is referred to as a shared image.

The restriction information storage area 43 is a storage area in which later described restriction information is stored.

In the image forming apparatus 1, the control portion 100, by executing various types of processes in accordance with the processing programs by using the CPU, functions as an authentication portion 101, a mode setting process portion 102, a restriction information generation portion 103, a first determination portion 104, a second determination portion 105, a restriction process portion 106, an image formation control portion 107, and a notification portion 108. It should be noted that one or more of the functions of the control portion 100 may be implemented as electronic circuits.

The authentication portion 101 conducts an authentication process on the basis of a user ID inputted on the login screen, and the first registration information (user ID) stored in the registration information storage area 41. The authentication portion 101 approves an operator, who has inputted a user ID on the login screen, as a user of the image forming apparatus 1, when the user ID inputted on the login screen matches the first registration information stored in the registration information storage area 41. In the following, the user who has been approved by the authentication portion 101 as a user of the image forming apparatus 1 is referred to as a login user. When the authentication portion 101 determines that the user ID inputted on the login screen does not match the first registration information stored in the registration information storage area 41, the control portion 100 causes the operation display portion 3 to display a predetermined error message notifying that the image forming apparatus 1 cannot be used.

When the user is approved by the authentication portion 101, the mode setting process portion 102 sets the mode of the image forming apparatus 1 to either a security setting mode or an image output mode, in accordance with a user operation by the login user. The security setting mode is a mode for executing security settings in accordance with the user operation with respect to the shared image stored in the image data storage area 42. The security settings are settings for a shared image to be restricted of being outputted as an image, or a user who is a subject restricted from outputting the shared image. The image output mode is a mode for outputting the shared image stored in the image data storage area 42 of the storage portion 4.

The restriction information generation portion 103 is configured to generate restriction information for restricting output of image data through the image forming portion 2, on the basis of operation signals of a user operation when the security setting mode is applied by the mode setting process portion 102.

As shown in FIG. 3B, the restriction information contains information showing the correspondence relationship between identification information of image data of the shared image stored in the image data storage area 42, and a user ID of a login user (hereinafter, referred to as a security setting individual) who performs a setting operation of restricting output of image data. For example, as shown in FIG. 3B, the restriction information contains information showing the correspondence relationship between image data of a shared image whose identification information is "G1", and the security setting individual who is user ID1.

In addition, the restriction information also contains information showing the correspondence relationship between the identification information of the image data of the shared image stored in the image data storage area 42, and a user ID of a user (hereinafter, referred to as a restricted subject) who is a subject restricted from outputting the image data as a result of the setting operation performed by the security setting individual. For example, as shown in FIG. 3B, information showing the correspondence relationship between image data of a shared image whose identification information is "G1", and the restricted subject who is user ID2 is contained.

In the manner described above, the storage portion 4 stores image data of an image that includes a photographic-subject image of another individual who is different from the operator, and that is provided with restriction information for restricting output of image data through the image forming portion 2.

The restriction information generation portion 103 stores the generated restriction information in the restriction information storage area 43. It should be noted that the security setting individual can be considered a subject for privacy protection.

Here, shared images stored in the image data storage area 42 include images that have captured both the security setting individual and the restricted subject, image that have captured either one of the security setting individual and the restricted subject, and images that have captured neither the security setting individual nor the restricted subject. Among these shared images, an image that has captured at least the security setting individual, and for which the restriction information is generated by the restriction information generation portion 103 as a result of the restricted subject being set by this security setting individual, corresponds to a first image of the present disclosure. In other words, the first image is a shared image that includes a photographic-subject image of another individual who is different from the operator who is intending to output the image, and that is provided with the restriction information for restricting output of image data through the image forming portion 2. In the following, the image data of the first image is referred to as first image data.

The first determination portion 104 is configured to determine whether or not the operator (login user) is a restricted subject who is restricted from outputting through the image forming portion 2. In detail, when an instruction (image output instruction) to output an image is inputted in the image forming apparatus 1 by the operator, and the first image is designated in the image output instruction, the first determination portion 104 determines whether or not the operator is the restricted subject on the basis of the restriction information.

When the operator is determined to be the restricted subject by the first determination portion 104, the second determination portion 105 is configured to determine whether or not sharpness of the first image is larger than a predetermined first threshold. In the present embodiment, the sharpness changes depending on values of parameters such as a resolution of the shared image, the size of a sheet member on which the shared image is to be outputted, the printing accuracy (resolution) by the image forming portion 2, and the size of a photographic subject in the shared image, etc. In this case, the threshold is determined depending on the values of the parameters. Whether or not the operator viewing the image outputted on the sheet member can clearly visually recognize the photographic-subject image of the user included in the image, i.e., visibility of the photographic-subject image, changes depending on whether or not the sharpness is larger than the first threshold. Here, the total number of individuals captured in the image is one example of an item that changes visibility of the photographic-subject image depending on the values of these parameters. In the present embodiment, the first threshold is set by the total number of individuals captured in the image. A setting value of the first threshold is determined depending on the value of the parameter. Thus, the second determination portion 105 determines whether or not the sharpness of the first image is larger than the predetermined first threshold, on the basis of the total number of individuals captured in the image. More specifically, when the total number of individuals captured in the image is larger than a predetermined second threshold; the photographic-subject image of each individual captured in the picture is small, and the sharpness is determined as to be not larger than the predetermined first threshold. In this case, even when the first image data is printed out, since the photographic-subject image that appears on the printed matter is not clear, the need to protect privacy of the individual of the photographic-subject image is small. On the other hand, when the total number of individuals captured in the image is not larger than the second threshold, the second determination portion 105 determines that the photographic-subject image of each of the individuals captured in the picture is large, and the sharpness is larger than the first threshold. In this case, when the first image data is printed out, since the photographic-subject image that appears on the printed matter is clear, the need to protect privacy of the individual of the photographic-subject image is large.

When the operator is determined to be the restricted subject by the first determination portion 104, the restriction process portion 106 outputs, to the image formation control portion 107, a restriction signal for restricting output of the first image data of the first image designated in the image output instruction, and executes a restriction process to restrict output through the image forming portion 2. On the other hand, when the operator is determined not to be the restricted subject by the first determination portion 104, the restriction process portion 106 outputs, to the image formation control portion 107, an approval signal for approving output of the first image data of the first image designated in the image output instruction, and approves output of the first image data of the first image through the image forming portion 2.

However, even when the operator is determined as to be the restricted subject by the first determination portion 104, the restriction process portion 106 outputs, to the image formation control portion 107, the approval signal for approving output of the first image data when the sharpness of the first image is determined to be not larger than the threshold by the second determination portion 105. On the other hand, when the operator is determined as to be the restricted subject by the first determination portion 104, the restriction process portion 106 outputs, to the image formation control portion 107, the restriction signal for restricting output of the first image data when the sharpness of the first image is determined to be larger than the threshold by the second determination portion 105. Thus, the restriction process portion 106 executes the restriction process when the operator is determined as to be the restricted subject by the first determination portion 104, and when the sharpness of the first image is determined to be larger than the threshold by the second determination portion 105.

The image formation control portion 107 is configured to control the image forming portion 2. The image formation control portion 107 causes the image forming portion 2 to execute output of the first image data when the approval signal has been received from the restriction process portion 106. In addition, the image formation control portion 107 causes the image forming portion 2 to restrict output of the first image data when the restriction signal has been received from the restriction process portion 106.

In the present embodiment, restricting output of the first image data through the image forming portion 2 is prohibiting the image forming portion 2 to conduct an image formation process on the basis of the first image data. On the other hand, when the operator is determined not to be the restricted subject by the first determination portion 104, the restriction process portion 106 outputs, to the image formation control portion 107, the approval signal approving output of the first image data of the first image designated in the image output instruction.

The notification portion 108 is configured to notify, by using the operation display portion 3, the user about output of the first image data of the first image designated in the image output instruction being prohibited. For example, the notification portion 108 displays, on the display portion 31, a message notifying that output of the first image data is prohibited. In addition, at the moment of the display, an alarm sound may be sounded, or the error message may be blinked.

Next, by using FIGS. 4 to 7, an image-output process by the control portion 100 of the present embodiment will be described, and respective steps of an image processing method and an image processing program according to the present disclosure will be described. The following processes are initiated when, for example, the power of the image forming apparatus 1 is turned on. It should be noted that, in the flowcharts in FIGS. 4 to 7, step S401, S402, . . . , each represent a number of a processing procedure (step).

<Step S401>

Figure 4:
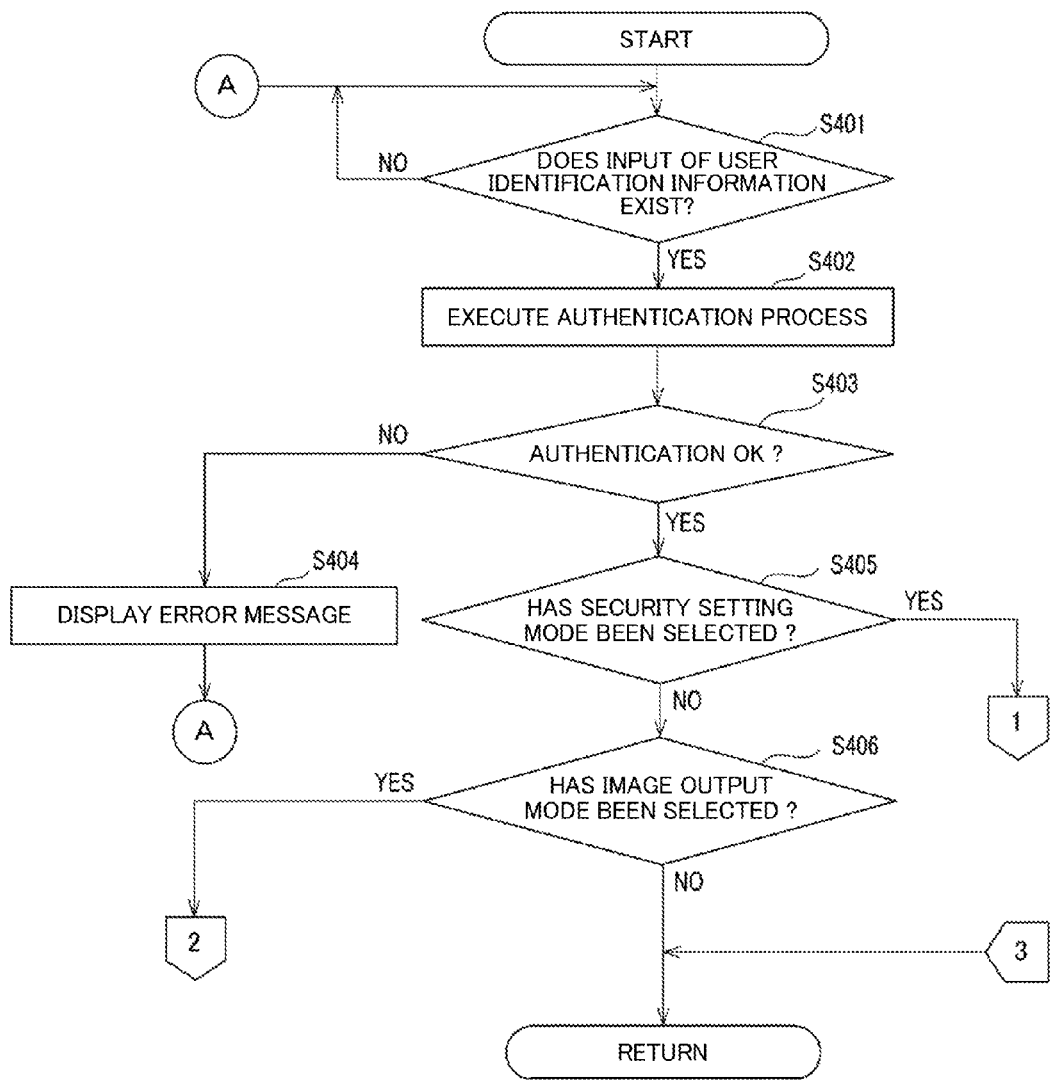
FIG. 4 is a flowchart showing a series of image-output processes conducted by a control portion of the first embodiment.

As shown in FIG. 4, at step S401, the authentication portion 101 determines whether or not the user ID has been inputted on the login screen. When the authentication portion 101 determines that the user ID has not been inputted (NO at step S401), the authentication portion 101 executes the process at step S401 again. On the other hand, when the authentication portion 101 determines that the user ID has been inputted (YES at step S401), the authentication portion 101 executes the process at step S402.

<Step S402>

At step S402, the authentication portion 101 executes the authentication process. More specifically, the authentication portion 101 determines whether or not the inputted user ID has been stored in the registration information storage area 41.

<Step S403>

Then, when the inputted user ID has not been stored in the registration information storage area 41 (NO at step S403), the authentication portion 101 executes the process at step S404. On the other hand, when the inputted user ID has been stored in the registration information storage area 41 (YES at step S403), the authentication portion 101 approves usage of the image forming apparatus 1 by the operator who inputted the user ID, and displays a predetermined mode setting screen on the operation display portion 3. Then, the control portion 100 executes the process at step S405.

<Step S404>

The authentication portion 101 displays, on the operation display portion 3, a predetermined error message notifying that the image forming apparatus 1 cannot be used, and returns to the process at step S401.

<Step S405>

The control portion 100 determines whether or not the security setting mode has been selected on the mode setting screen. When the control portion 100 determines that the security setting mode has not been selected (NO at step S405), the control portion 100 executes the process at step S406. On the other hand, when the control portion 100 determines that the security setting mode has been selected (YES at step S405), the control portion 100 executes the process at step S501.

<Step S406>

At step S406, the control portion 100 determines whether or not the image output mode has been selected on the mode setting screen. When the control portion 100 determines that the image output mode has not been selected on the mode setting screen (NO at step S406), the control portion 100 returns to the process at step S401. On the other hand, when the control portion 100 determines that the image output mode has been selected (YES at step S406), the control portion 100 executes the process at step S701.

<Step S501>

Figure 5:
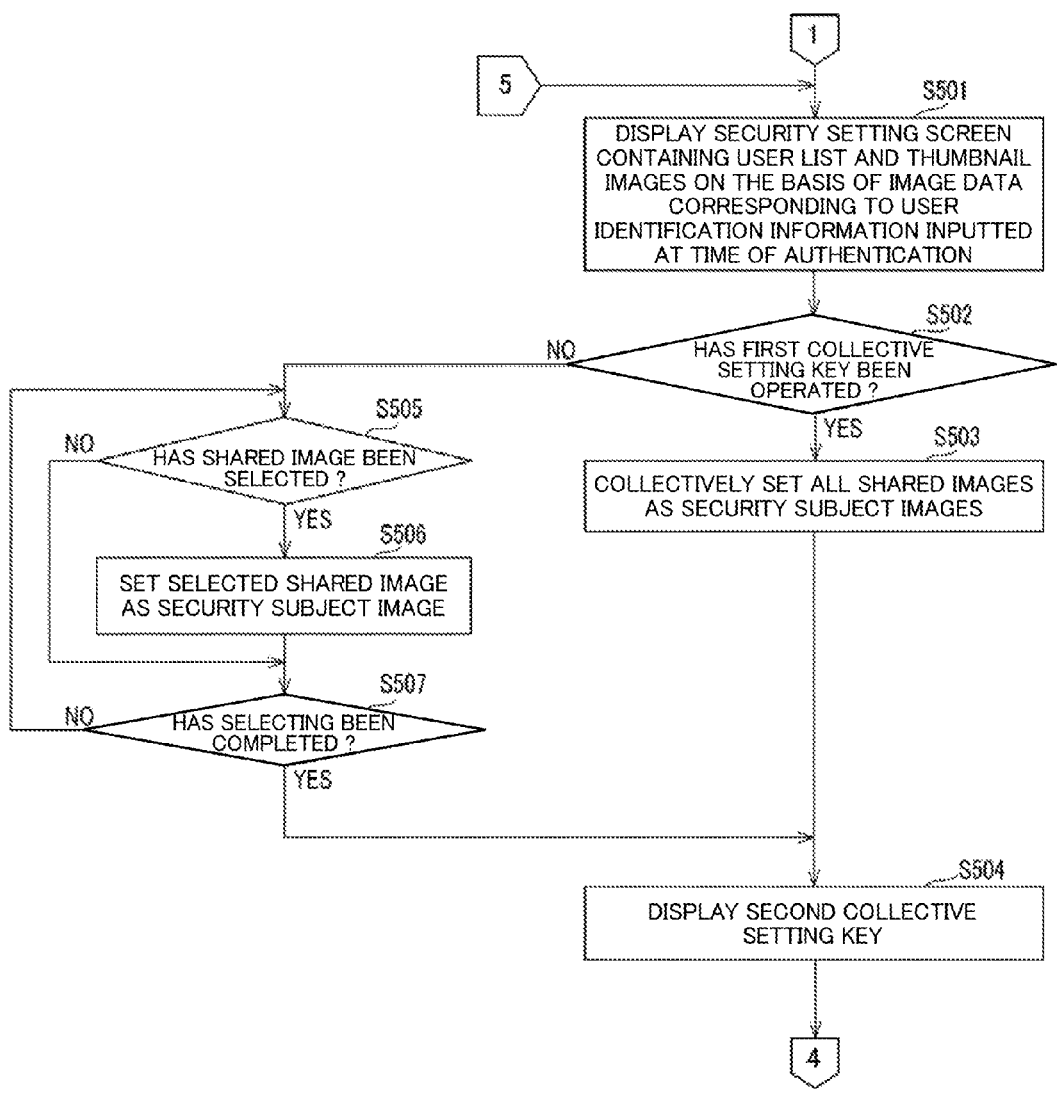
FIG. 5 is a flowchart showing a series of the image-output processes conducted by the control portion of the first embodiment.

In the security setting mode, as shown in FIG. 5, at step S501, the control portion 100 causes the operation display portion 3 to display a security setting screen that is not diagrammatically represented. The security setting screen includes a user list and thumbnail images of shared images corresponding to a user ID inputted at the time of authentication. Here, the shared images (thumbnail images) corresponding to the user ID inputted at the time of authentication refers to shared images capturing the operator (login user) with the user ID. Thus, only the shared images capturing the operator (login user) are displayed on the security setting screen.

On the basis of information (information shown in FIG. 3A) stored in the registration information storage area 41, the control portion 100 detects identification information of image data of the shared images corresponding to the user ID inputted at the time of authentication. Then, the control portion 100 reads out the image data of the shared images corresponding to the identification information from the image data storage area 42. The control portion 100 generates low-resolution thumbnail images based the image data of the read-out shared images, and displays the thumbnail images on the operation display portion 3. In addition, the control portion 100 displays the user list on the operation display portion 3 on the basis of the user ID of the user of the image forming apparatus 1 stored in the registration information storage area 41. It should be noted that a later described first collective setting key is displayed on the security setting screen.

<Step S502>

At step S502, the restriction information generation portion 103 determines whether or not, on the basis of the operation signals received from the operation display portion 3, the first collective setting key has been operated and all the shared images displayed on the security setting screen have been collectively designated as subjects for security. When the restriction information generation portion 103 determines that the first collective setting key has been operated (YES at step S502), the restriction information generation portion 103 executes the process at step S503. When the restriction information generation portion 103 determines that the first collective setting key has not been operated (NO at step S502), the restriction information generation portion 103 executes the process at step S505.

<Step S503>

At step S503, the restriction information generation portion 103 collectively sets all the shared images displayed on the security setting screen as subjects for security. More specifically, the restriction information generation portion 103 collectively associates the identification information of the operator (login user) approved at step S403 with the identification information of the image data of all the shared images displayed on the security setting screen. Then, the control portion 100 executes the process at step S504.

<Step S504>

At step S504, the control portion 100 displays a later described second collective setting key on the operation display portion 3. Then, the control portion 100 executes the process at step S601 (see FIG. 6).

<Step S505>

At step S505, the restriction information generation portion 103 determines, on the basis of the operation signals received from the operation display portion 3, whether or not an operation of selecting the shared images has been performed. When the operation of selecting the shared images is determined as to be performed (YES at step S505), the control portion 100 executes the process at step S506. On the other hand, when the operation of selecting the shared images is determined as not to be performed (NO at step S505), the control portion 100 skips the process at step S506 and executes the process at step S507.

<Step S506>

At step S506, the restriction information generation portion 103 sets the selected shared images as subjects for security. More specifically, the restriction information generation portion 103 associates the identification information of the login user approved at step S403 with the identification information of the image data of the selected shared images. Then, the restriction information generation portion 103 executes the process at step S507.

In this manner, the restriction information generation portion 103 collectively sets all the shared images displayed on the security setting screen as subjects for security when the first collective setting key is operated. In addition, when the first image is individually designated, the restriction information generation portion 103 generates the restriction information such that the designated restricted subject is associated individually with respect to the individually designated first image. In addition, when the second collective setting key is operated, the restriction information generation portion 103 collectively sets all users displayed on the security setting screen as restricted subjects. In addition, when a user is individually designated as a restricted subject, the restriction information generation portion 103 generates the restriction information such that the designated restricted subject is associated individually with the designated first image.

<Step S507>

At step S507, the restriction information generation portion 103 determines whether or not selecting of the shared images has been completed, on the basis of the operation signals received from the operation display portion 3. When the restriction information generation portion 103 determines that selecting of the shared images has not been completed (NO at step S507), the restriction information generation portion 103 returns to the process at step S505. On the other hand, when the restriction information generation portion 103 determines that selecting of the shared images has been completed (YES at step S507), the control portion 100 executes the process at step S504.

<Step S601>

Figure 6:
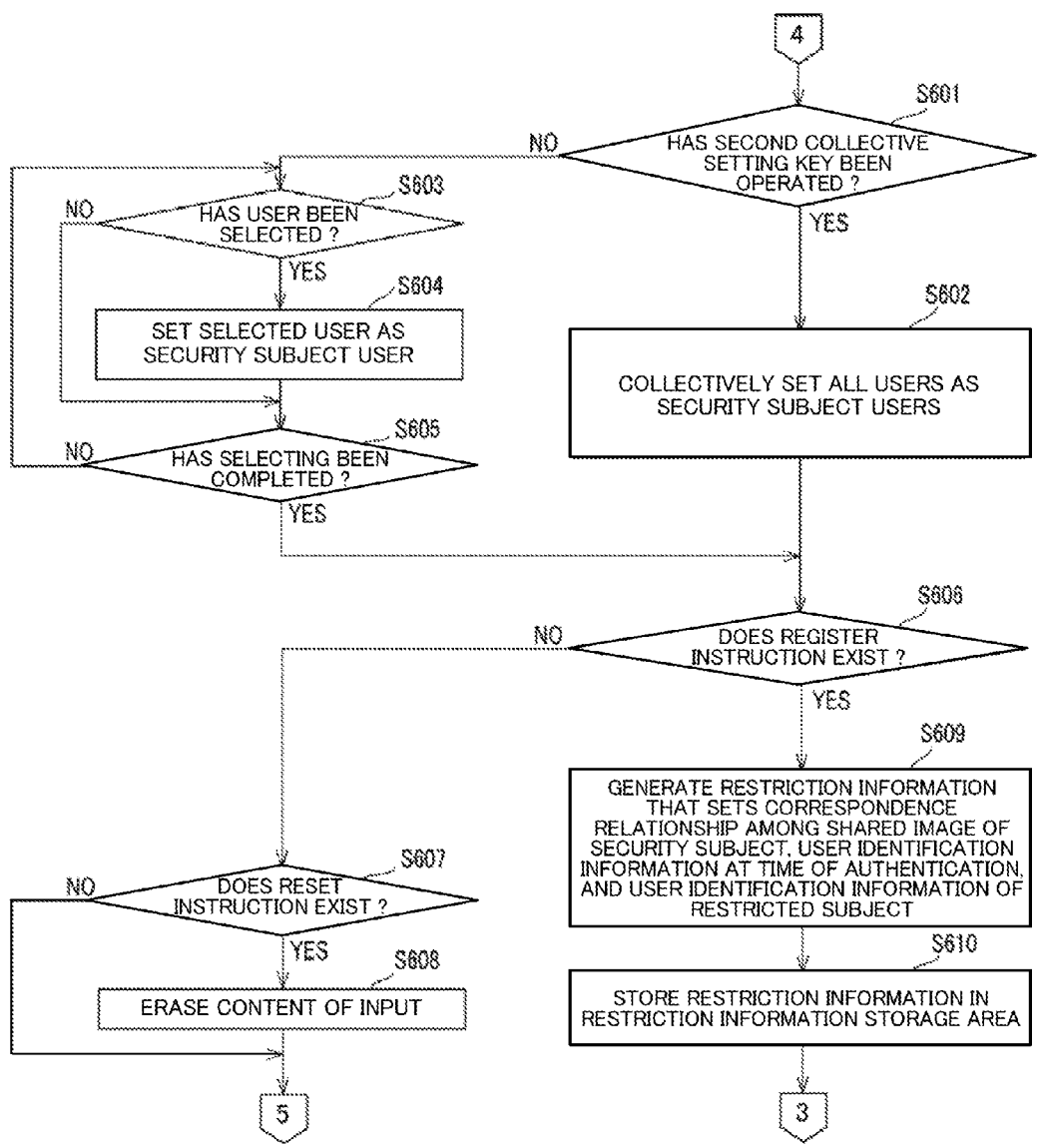
FIG. 6 is a flowchart showing a series of the image-output processes conducted by the control portion of the first embodiment.

As shown in FIG. 6, at step S601, the restriction information generation portion 103 determines whether or not the second collective setting key has been operated, on the basis of the operation signals received from the operation display portion 3. When the restriction information generation portion 103 determines that the second collective setting key has been operated (YES at step S601), the restriction information generation portion 103 executes the process at step S602.

<Step S602>

At step S602, with respect to the shared images set as subjects for security at step S503 or step S506, the restriction information generation portion 103 collectively sets all users listed in the user list as security subject users, i.e., restricted subjects. More specifically, the restriction information generation portion 103 collectively associates user IDs of all users listed in the user list with the identification information of the image data of the shared images set as subjects for security at step S503 or step S506. Then, the control portion 100 executes the process at step S606.

<Step S603>

At step S603, the restriction information generation portion 103 determines whether or not an operation of selecting a user from the user list has been performed, on the basis of operation signals received from the operation display portion 3. When the operation of selecting a user from the user list is determined as to be performed (YES at step S603), the control portion 100 executes the process at step S604. On the other hand, when the operation of selecting a user from the user list is determined as not to be performed (NO at step S603), the control portion 100 skips the process at step S604 and executes the process at step S605.

<Step S604>

At step S604, with respect to the shared images set as subjects for security at step S503 or step S506, the restriction information generation portion 103 sets the selected user as a user who is the subject for security, i.e., the restricted subject. More specifically, the restriction information generation portion 103 associates the identification information of the selected user with the identification information of the image data of the shared images set as subjects for security at step S503 or step S506. Then, the restriction information generation portion 103 executes the process at step S605.

<Step S605>

At step S605, the restriction information generation portion 103 determines whether or not selecting of the user has been completed, on the basis of operation signals received from the operation display portion 3. When the restriction information generation portion 103 determines that selecting of the user has not been completed (NO at step S605), the restriction information generation portion 103 returns to the process at step S603. On the other hand, when the restriction information generation portion 103 determines that selecting of the user has been completed (YES at step S605), the control portion 100 executes the process at step S606. The inputs by the operator at steps S501 to S507 and S601 to S605 are inputs for designating the first image and the restricted subject, and correspond to a first input of the present disclosure.

<Step S606>

At step S606, the control portion 100 determines whether or not an instruction to register setting operation information regarding setting operation performed at steps S502 to S507 and S601 to S605 has been inputted, on the basis of the operation signals received from the operation display portion 3. When the control portion 100 determines that the instruction to register the setting operation information has not been inputted (NO at step S606), the control portion 100 executes the process at step S607. On the other hand, when the control portion 100 determines that the instruction to register the setting operation information has been inputted (YES at step S606), the control portion 100 executes the process at step S609.

<Step S607>

At step S607, the control portion 100 determines whether or not an instruction to reset the setting operation information has been inputted, on the basis of the operation signals received from the operation display portion 3. When the control portion 100 determines that the instruction to reset the setting operation information has been inputted (YES at step S607), the control portion 100 executes the process at step S608. On the other hand, when the control portion 100 determines that the instruction to reset the setting operation information has not been inputted (NO at step S607), the control portion 100 returns to the process at step S501.

<Step S608>

At step S608, the restriction information generation portion 103 erases the setting operation information. Then, the control portion 100 returns to the process at step S501 (see FIG. 5).

<Step S609>

At step S609, the restriction information generation portion 103 generates, as the restriction information on the basis of the setting operation information, information that sets the correspondence relationship among the identification information of the shared image that is the subject of security, the identification information of the login user approved at step S403, and the identification information of the restricted subject set at step S602 or S604. Then, the control portion 100 executes the process at step S610.

<Step S610>

At step S610, the restriction information generation portion 103 stores the generated restriction information in the restriction information storage area 43. Then, the control portion 100 returns to step S401 (see FIG. 4).

<Step S701>

Figure 7:
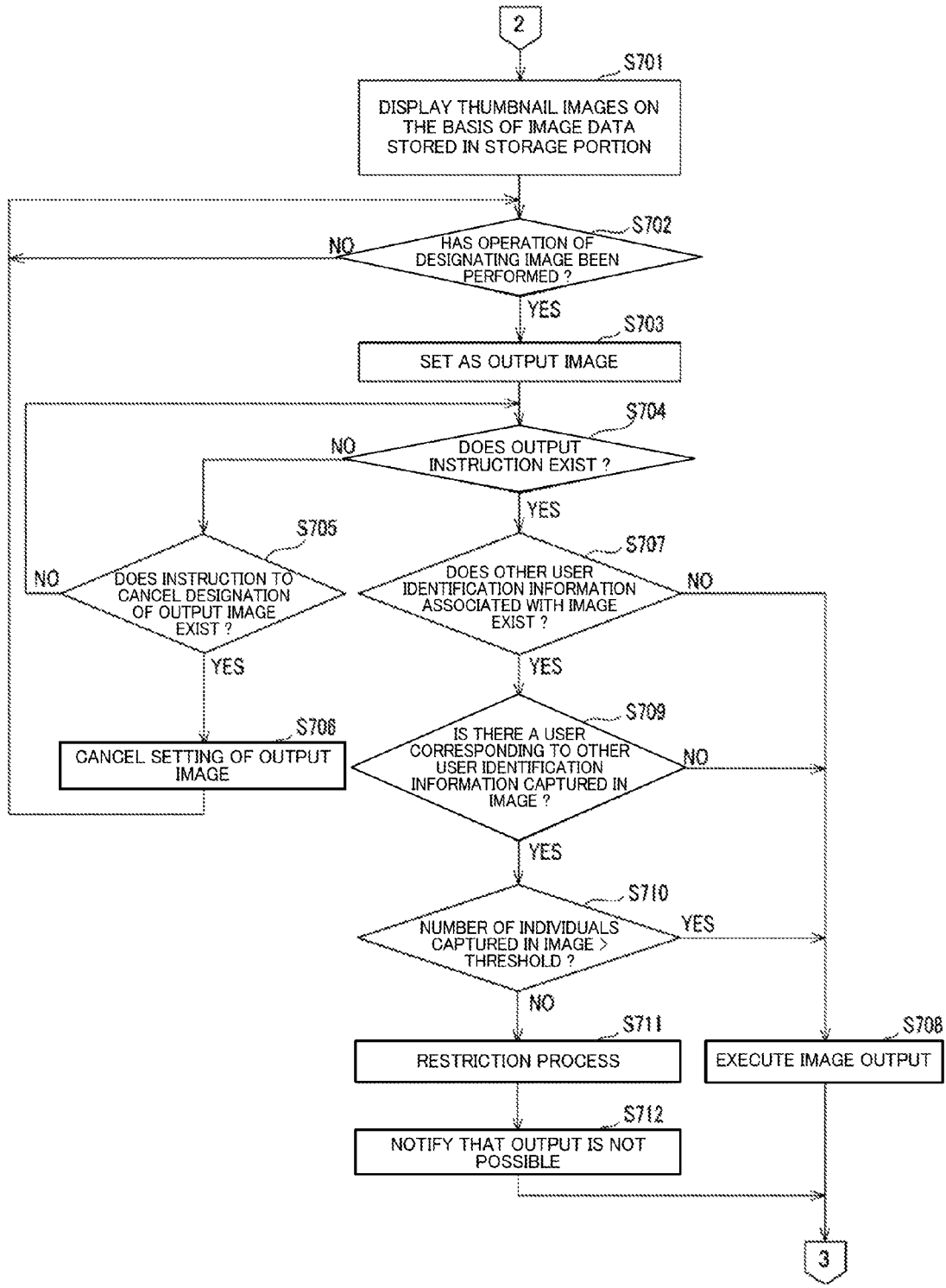
FIG. 7 is a flowchart showing a series of the image-output processes conducted by the control portion of the first embodiment.

In the image output mode, as shown in FIG. 7, first at step S701, the control portion 100 causes the display portion 31 to display the thumbnail image of the shared image stored in the image data storage area 42.

<Step S702>

At step S702, the control portion 100 determines whether or not an operation of designating the shared image has been performed, on the basis of the operation signals received from the operation display portion 3. When the control portion 100 determines that the operation of designating the shared image has not been performed (NO at step S702), the control portion 100 executes the process at step S702 again. On the other hand, when the control portion 100 determines that the operation of designating the shared image has been performed (YES at step S702), the control portion 100 executes the process at step S703.

<Step S703>

At step S703, the control portion 100 sets the designated shared image as an output image. Then, the control portion 100 executes the process at step S704.

<Step S704>

At step S704, the control portion 100 determines whether or not image output instruction has been inputted, on the basis of the operation signals received from the operation display portion 3. When the control portion 100 determines that the image output instruction has not been inputted (NO at step S704), the control portion 100 executes the process at step S705. On the other hand, when the control portion 100 determines that the image output instruction has been inputted (YES at step S704), the control portion 100 executes the process at step S707.

<Step S705>

At step S705, the control portion 100 determines whether or not an instruction to cancel the designation of the output image has been performed at step S703, on the basis of the operation signals received from the operation display portion 3. When the control portion 100 determines that the cancellation instruction has not been inputted (NO at step S705), the control portion 100 returns to the process at step S704. On the other hand, when the control portion 100 determines that the cancellation instruction has been inputted (YES at step S705), the control portion 100 executes the process at step S706.

<Step S706>

At step S706, the control portion 100 cancels the designation of the output image performed at step S703. Then, the control portion 100 returns to step S702.

<Step S707>

At step S707, the first determination portion 104 determines whether or not there is another user ID associated with the image data of the shared image that has been set as the output image. More specifically, the first determination portion 104 determines whether or not the image designated in the image output instruction is the first image. When the image designated in the image output instruction is the first image, the first determination portion 104 determines, on the basis of the restriction information, whether or not the operator (login user) attempting to cause the image forming apparatus 1 to output the image is set as the restricted subject who is restricted from outputting through the image forming portion 2 for the image data of the shared image that has been set as the output image. Step S707 corresponds to a first step of the present disclosure.

When the first determination portion 104 determines that there is no other user ID associated with the output image (NO at step S707), the control portion 100 executes the process at step S708 since problems related to privacy protection do not exist. On the other hand, when the first determination portion 104 determines that there is another user ID associated with the output image (YES at step S707), the control portion 100 executes the process at step S709.

<Step S708>

At step S708, the restriction process portion 106 outputs, to the image formation control portion 107, the approval signal approving output of the image data of the shared image that has been set as the output image, and the image formation control portion 107 causes the image forming portion 2 to execute output of the shared image. Then, the control portion 100 returns to step S401 (see FIG. 4). Step S708 corresponds to a third step of the present disclosure.

<Step S709>

At step S709, the control portion 100 determines whether or not a photographic-subject image of the user corresponding to the other user ID is captured in the output image. More specifically, the control portion 100 determines whether or not the other user ID is associated with the identification information of the image data of the shared image that has been set as the output image, on the basis of the second registration information (see FIG. 3A) stored in the registration information storage area 41.

When the control portion 100 determines that the photographic-subject image of the user corresponding to the other user ID is not captured in the output image (NO at step S709), the control portion 100 executes the process at step S708 since problems related to privacy protection do not exist. On the other hand, when the control portion 100 determines that the photographic-subject image of the user corresponding to the other user ID is captured in the shared image that has been set as the output image (YES at step S709), the control portion 100 executes the process at step S710.

<Step S710>

At step S710, the second determination portion 105 determines, on the basis of the second registration information (see FIG. 3A) stored in the registration information storage area 41, whether or not the total number of individuals captured in the designated shared image is larger than the predetermined threshold. When the second determination portion 105 determines that the total number of individuals captured in the designated shared image is larger than the threshold (YES at step S710), the control portion 100 executes the process at step S708 since problems related to privacy protection do not exist as described above. On the other hand, when the second determination portion 105 determines than the total number of individuals captured in the designated shared image is not larger than the threshold (NO at step S710), the control portion 100 executes the process at step S711.

<Step S711>

At step S711, the restriction process portion 106 executes the restriction process of restricting output, through the image forming portion 2, of the image data of the shared image that has been set as the output image. Thus, in the present embodiment, the restriction process portion 106 outputs, to the image formation control portion 107, the restriction signal restricting output of the image data, and causes the image formation control portion 107 to execute, as the restriction process, a process of restricting output through the image forming portion 2. Step S711 corresponds to a second step of the present disclosure.

<Step S712>

At step S712, the notification portion 108 notifies, by using the operation display portion 3 or an acoustic output portion that is not diagrammatically represented, the user about output of the designated shared image being prohibited. Then, the control portion 100 returns to step S401 (see FIG. 4).

As described above, the image forming apparatus 1 receives an input from the security setting individual who designates an output restricted subject who is a subject to be restricted from outputting an image and a subject image to be restricted from being outputted, and generates the restriction information. Then, in a case where a certain operator (login user) attempts to cause the image forming apparatus 1 to output a certain shared image, the image forming apparatus 1 restricts the output, when identification information of another user who has set the operator as the restricted subject corresponds to identification information in the image data of the shared image, and when the photographic-subject image of the other user ID is contained in the shared image. In addition, when the other user captured in the image has not set the operator as the restricted subject, the operator is not restricted from outputting the image based the image output instruction.

As a result, output can be accepted or restricted depending on other users for images shared by each user.

[Second Embodiment]

To restrict output in the first embodiment is to prohibit printing of an image. On the other hand, in a second embodiment, the restriction process portion 106 executes, as the restriction process, predetermined image processing to render visual identification of the photographic-subject image impossible, with respect to a photographic-subject image of a security setting individual. As the image processing, pixelization, paint-out process, and a process of fitting another image are conceivable.

In addition, the control portion 100 accepts designation of the part of the body where the image processing is to be conducted. In the present embodiment, the control portion 100 accepts designation of the whole body or face as the part on which the image processing is to be conducted. For example, as shown in FIG. 8, the restriction information generation portion 103 generates control information including first information indicating the designated part of the body.

Next, processes conducted by the control portion 100 in the security setting mode and the image output mode in the present embodiment will be described by using FIGS. 9 and 10. It should be noted that the security setting mode is different from that in the first embodiment in terms of additional steps S901 and S902. Furthermore, the image output mode is different in terms of the process at step S1001 being conducted instead of steps S711 and S712. In the following, only what is different from the first embodiment will be described.

<Step S901>

Figure 9:
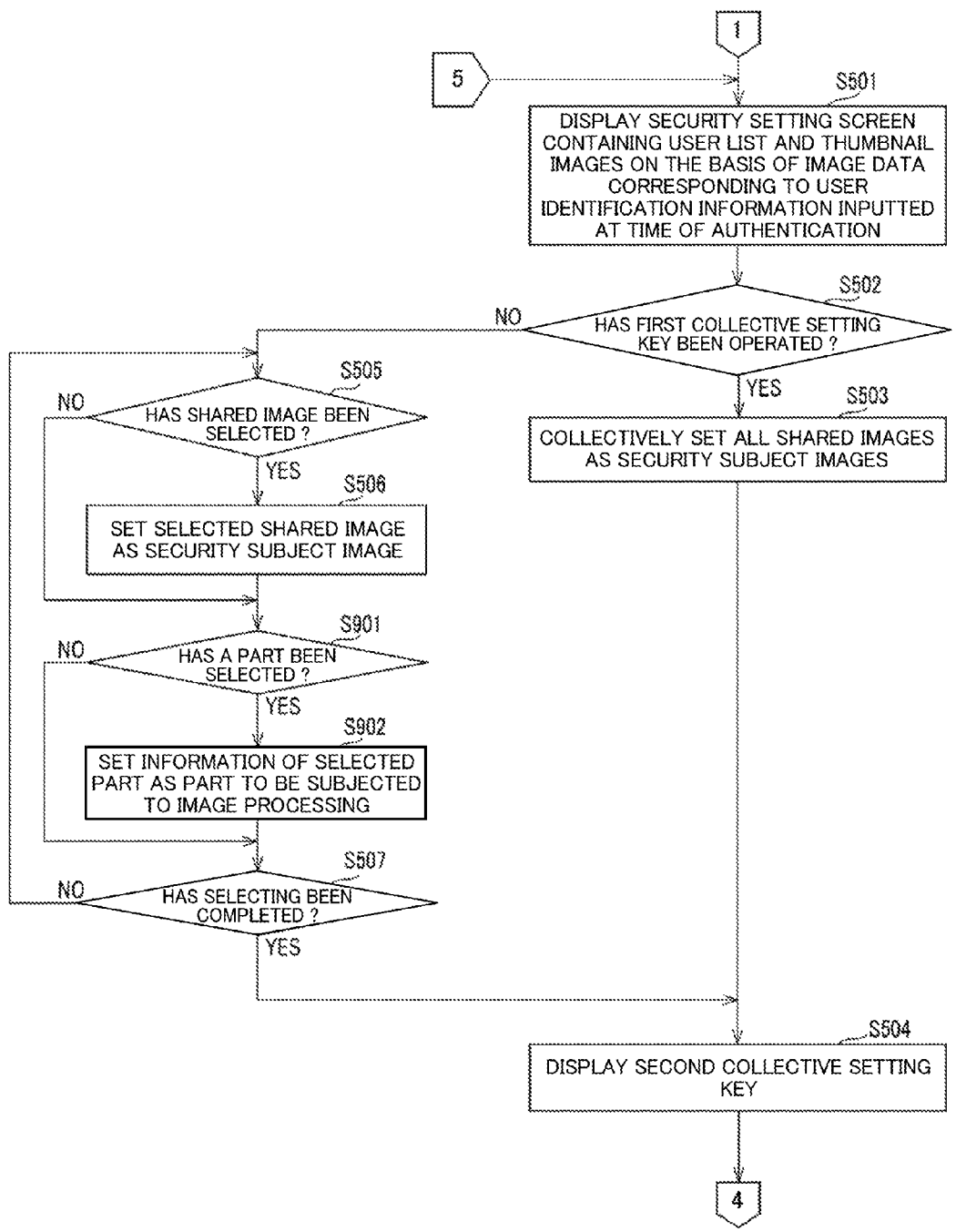
FIG. 9 is a flowchart showing processes of the control portion in a security setting mode in a second embodiment.

As shown in FIG. 9, after the process at step S506, the restriction information generation portion 103 executes the process at step S901. At step S901, the restriction information generation portion 103 determines, on the basis of the operation signals received from the operation display portion 3, whether or not an operation has been performed regarding selecting a part of the body, here, the whole body or the face, as the subject on which the image processing is to be performed. When the operation of selecting a part of the body is determined as to be performed (YES at step S901), the control portion 100 executes the process at step S902. On the other hand, when the operation of selecting a part of the body is determined as not to be performed (NO at step S901), the control portion 100 skips the process at step S902 and executes the process at step S509.

<Step S902>

At step S902, the restriction information generation portion 103 sets the selected part of the body as a part on which the image processing is to be conducted. More specifically, the restriction information generation portion 103 associates information of the selected part of the body with identification information of the image data of the selected shared image. Then, the control portion 100 executes the process at step S507.

<Step S1001>

Figure 10:
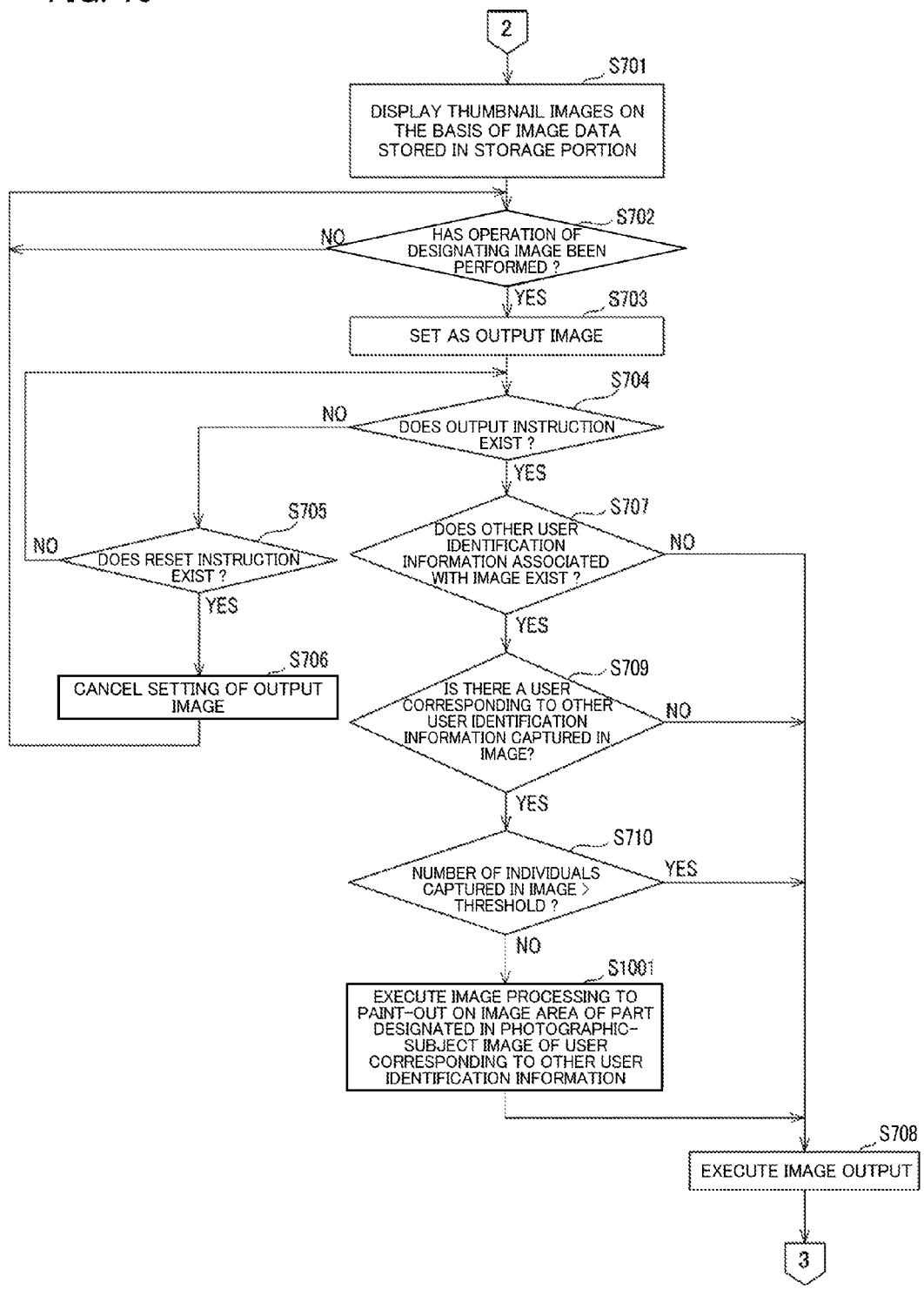
FIG. 10 is a flowchart showing processes of the control portion in an image output mode in the second embodiment.

As shown in FIG. 10, after the process at step S710, the control portion 100 executes the process at step S1001. At step S1001, the control portion 100 executes image processing for painting out an image area of the designated part in the photographic-subject image of the user corresponding to the other user ID. Then, the control portion 100 executes the process at step S709.

Figure 11A:
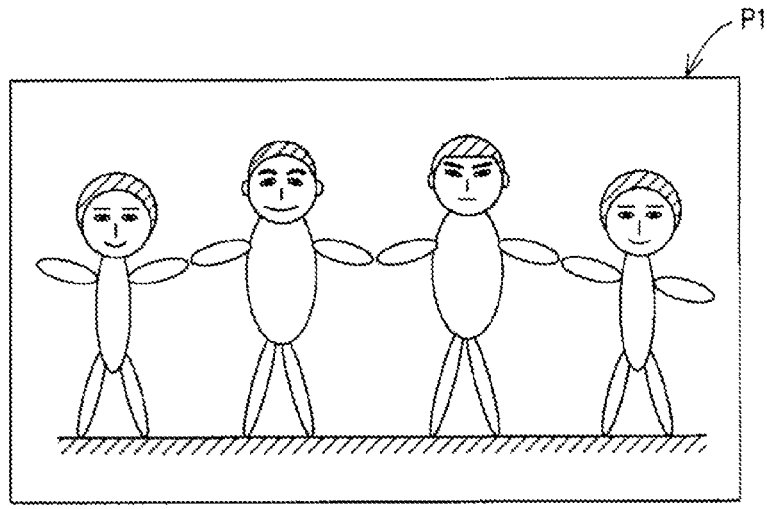
FIGS. 11A to 11C each show an image outputted in the second embodiment.
Figure 11B:
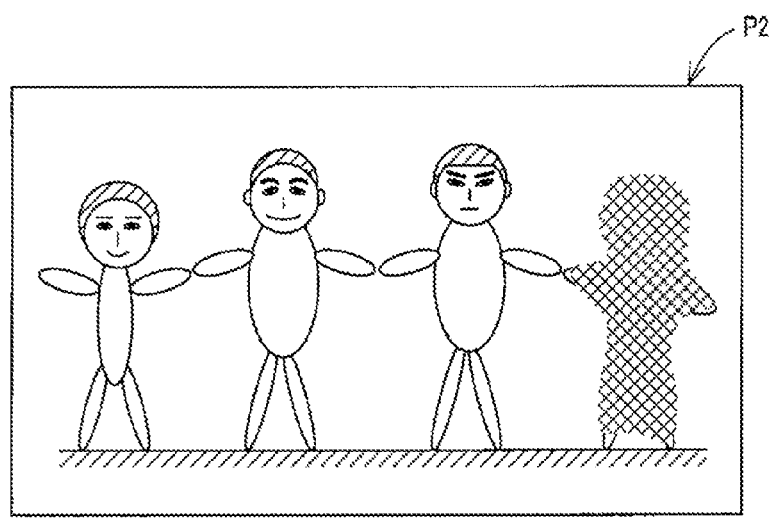
Figure 11C:
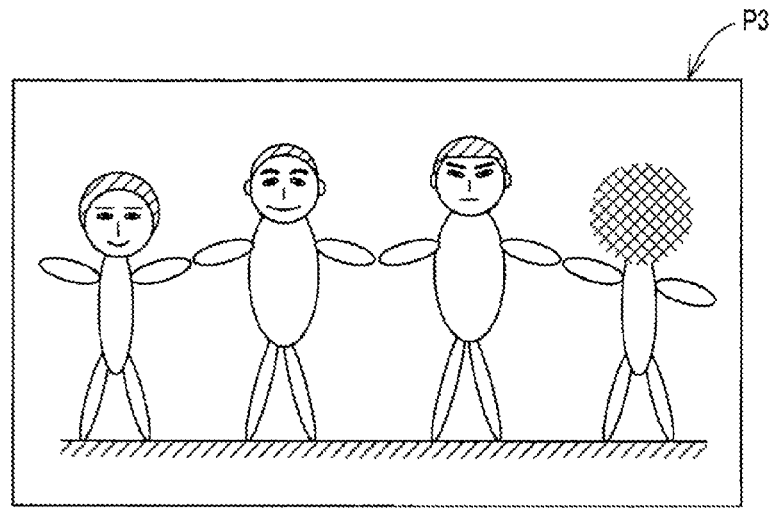

With this, for example, in a case where image P1 shown in FIG. 11A is an image outputted when an image output instruction is inputted by a login user who is not a restricted subject, if the whole body is set as the part of the body on which the image processing is to be conducted at step S902, image P2 shown in FIG. 11B is outputted. Furthermore, if the face is set as the part of the body on which the image processing is to be conducted at step S902, image P3 shown in FIG. 11C is outputted.

In the manner described above, when the photographic-subject image of the other individual associated with the first image designated in the image output instruction is included, the restriction process portion 106 executes the image processing on an image of the part of the body indicated by the first information in the photographic-subject image.

Although preferred embodiments of the present disclosure have been described above, the present disclosure is not limited to the contents described above, and various modifications can be made.

The restriction process portion 106 is also applicable to a configuration in which, after the process at step S712, for example, input of predetermined cancellation information is being accepted for a certain period of time, and execution of the restriction process is cancelled when input of the predetermined cancellation information is received. With respect to the second embodiment in which the image processing such as the paint-out process is performed and in which the restriction on the output is cancelled when input of the identification information is received after the identification information is being accepted from the security setting individual; another conceivable embodiment is one in which the control portion 100 notifies about conducting the image processing, accepts input of, for example, identification information of the security setting individual within a certain period of time after the notification, and cancels the restriction of the output when the identification information is inputted. For example, the identification information of the security setting individual associated in the first image data designated in the image output instruction is applicable as the predetermined cancellation information.

Although the second determination portion 105 determines whether or not the sharpness of the shared image is larger than a predetermined threshold on the basis of the total number of individuals included in the shared image in the first embodiment, the present disclosure is not limited thereto, and a configuration in which the determination is conducted on the basis of contrast of the shared image is also conceivable as another embodiment. More specifically, when the contrast of the shared image is larger than a predetermined third threshold, the second determination portion 105 determines that the sharpness of the first image is larger than the first threshold, and when the contrast is not larger than the third threshold, the second determination portion 105 determines that the sharpness of the shared image is not larger than the first threshold.

Another conceivable embodiment is a configuration in which the image forming apparatus 1 imports an image from an external device such as a personal computer, a USB memory, or the like, and determines a user included in the image.

In this case, the image forming apparatus 1 includes a user detection portion. The user detection portion detects a user included in the shared image when the image is inputted to the image forming apparatus 1 from the external device. Specifically, the user detection portion extracts a photographic-subject image contained in the shared image, and matches the extracted image and the verification image stored in the registration information storage area 41. When the user detection portion detects a photographic-subject image matching the verification image stored in the registration information storage area 41 in the extracted photographic-subject image, the user detection portion reads, from the registration information storage area 41, a user ID corresponding to the verification image that has matched the photographic-subject image, and associates the shared image and the user ID.

For example, as shown in FIG. 3A, when the user detection portion detects that a photographic-subject image contained in shared image G1 matches a verification image in which a user ID1 and user ID2 are associated, the user detection portion associates those user IDs with the shared image G1. Thus, the user detection portion detects a user whose photographic-subject image is contained in the shared image G1.

Output of the image data is not limited to the image formation process (printing process) based on the image data, and also includes a process of transmitting the image data. In this case, a transmission process portion configured to transmit the image data is one example of an output portion of the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
an output portion capable of outputting image data of an image designated in an image output instruction inputted through an operation by an operator;
a storage portion configured to store first image data of a first image that includes a photographic-subject image of another individual who is different from the operator, and that is provided with restriction information for restricting output of the image data through the output portion;
a first determination portion configured to determine, on a basis of the restriction information and when the first image is designated in the image output instruction, whether or not the operator is a restricted subject who is restricted from outputting through the output portion;
a restriction process portion configured to execute, when the operator is determined to be the restricted subject by the first determination portion, a restriction process to restrict output, through the output portion, of the first image data of the first image designated in the image output instruction, and, when the operator is determined not to be the restricted subject by the first determination portion, approve output, through the output portion, of the first image data of the first image designated in the image output instruction; and a second determination portion configured to determine, when the operator is determined to be the restricted subject by the first determination portion, whether or not sharpness of the first image is larger than a predetermined first threshold, wherein the second determination portion is configured to determine that the sharpness of the first image is not larger than the predetermined first threshold when a total number of individuals contained in the first image designated in the image output instruction is larger than a predetermined second threshold, and determine that the sharpness of the first image is larger than the predetermined first threshold when the total number of individuals is not larger than the predetermined second threshold, and the restriction process portion is configured to execute the restriction process when the sharpness of the first image is determined to be larger than the predetermined first threshold by the second determination portion, and approve output of the first image data through the output portion when the sharpness of the first image is determined to be not larger than the predetermined first threshold by the second determination portion.

2. The image processing apparatus according to claim 1, wherein the second determination portion is configured to determine that the sharpness of the first image is larger than the predetermined first threshold when contrast of the first image is larger than a predetermined third threshold, and determine that the sharpness of the first image is not larger than the predetermined first threshold when the contrast is not larger than the predetermined third threshold.

3. The image processing apparatus according to claim 1, wherein the restriction process portion is configured to execute, as the restriction process, predetermined image processing to render visual identification of the photographic-subject image impossible, with respect to a photographic-subject image of the another individual indicated by identification information of the another individual associated with the first image which has been designated in the image output instruction.

4. The image processing apparatus according to claim 3, wherein the restriction information includes first information indicating a part of a body, and the restriction process portion is configured to, when the photographic-subject image of the another individual associated with the first image which has been designated in the image output instruction is included, execute the predetermined image processing with respect to an image of the part of the body indicated by the first information in the photographic-subject image.

5. The image processing apparatus according to claim 1, further comprising a restriction information generation portion configured to generate the restriction information and give the generated restriction information to the first image.

6. The image processing apparatus according to claim 5, wherein the restriction information generation portion is configured to generate, when a first input for designating the first image and the restricted subject collectively designates a plurality of the restricted subjects, the restriction information such that the plurality of the restricted subjects are associated collectively with the first image designated by the first input, and generate, when the first input individually designates the restricted subject, the restriction information such that the restricted subject is individually associated with the first image designated by the first input.

7. The image processing apparatus according to claim 6, wherein the restriction information generation portion is configured to generate, when the first input collectively designates a plurality of the first images, the restriction information such that the plurality of the collectively designated first images are collectively associated with the restricted subject designated by the first input, and generate, when the first input individually designates the first image, the restriction information such that the restricted subject designated by the first input is individually associated with the individually designated first image.

8. The image processing apparatus according to claim 1, wherein the restriction process portion is configured to execute, as the restriction process, a process of prohibiting output of, through the output portion, the first image data designated in the image output instruction.

9. The image processing apparatus according to claim 8, further comprising a notification portion configured to notify that output of the first image data is prohibited.

10. The image processing apparatus according to claim 8, wherein the restriction process portion is configured to cancel execution of the restriction process when predetermined cancellation information is inputted.

11. The image processing apparatus according to claim 10, wherein the predetermined cancellation information is identification information of the another individual associated with the first image which has been designated in the image output instruction.

12. An image processing method for an image processing apparatus including: an output portion capable of outputting image data of an image designated in an image output instruction inputted through an operation by an operator; and a storage portion configured to store first image data of a first image that includes a photographic-subject image of another individual who is different from the operator, and that is provided with restriction information for restricting output of the image data through the output portion, the image processing method comprising:

a first step of determining, based on the restriction information and when the first image is designated in the image output instruction, whether or not the operator is a restricted subject who is restricted from outputting through the output portion;

a second step of executing, when the operator is determined to be the restricted subject at the first step, a restriction process to restrict output, through the output portion, of the first image data of the first image designated in the image output instruction;

a third step of approving, when the operator is determined not to be the restricted subject at the first step, output, through the output portion, of the first image data of the first image designated in the image output instruction; and a fourth step of determining, when the operator is determined to be the restricted subject at the first step, whether or not sharpness of the first image is larger than a predetermined first threshold, wherein the fourth step determines that the sharpness of the first image is not larger than the predetermined first threshold when a total number of individuals contained in the first image designated in the image output instruction is larger than a predetermined second threshold, and determines that the sharpness of the first image is larger than the predetermined first threshold when the total number of individuals is not larger than the predetermined second threshold, the second step executes the restriction process when the sharpness of the first image is determined to be larger than the predetermined first threshold at the fourth step, and the third step approves output of the first image data through the output portion when the sharpness of the first image is determined to be not larger than the predetermined first threshold at the fourth step.

13. A non-transitory computer-readable recording medium comprising: an image processing program recorded therein for an image processing apparatus including: an output portion capable of outputting image data of an image designated in an image output instruction inputted through an operation by an operator; and a storage portion configured to store first image data of a first image that includes a photographic-subject image of another individual who is different from the operator, and that is provided with restriction information for restricting output of the image data through the output portion, the image processing program including:
a first step of determining, based on the restriction information and when the first image is designated in the image output instruction, whether or not the operator is a restricted subject who is restricted from outputting through the output portion;
a second step of executing, when the operator is determined to be the restricted subject at the first step, a restriction process to restrict output, through the output portion, of the first image data of the first image designated in the image output instruction;
a third step of approving, when the operator is determined not to be the restricted subject at the first step, output, through the output portion, of the first image data of the first image designated in the image output instruction; and
a fourth step of determining, when the operator is determined to be the restricted subject at the first step, whether or not sharpness of the first image is larger than a predetermined first threshold, wherein the fourth step determines that the sharpness of the first image is not larger than the predetermined first threshold when a total number of individuals contained in the first image designated in the image output instruction is larger than a predetermined second threshold, and determines that the sharpness of the first image is larger than the predetermined first threshold when the total number of individuals is not larger than the predetermined second threshold, the second step executes the restriction process when the sharpness of the first image is determined to be larger than the predetermined first threshold at the fourth step, and the third step approves output of the first image data through the output portion when the sharpness of the first image is determined to be not larger than the predetermined first threshold at the fourth step.

\* \* \* \* \*